United States Patent [19]

Holt et al.

[11] 4,187,761
[45] Feb. 12, 1980

[54] VARIABLE FORCE CONTROL SYSTEM FOR WEAPON EJECTION MECHANISMS

[75] Inventors: Lloyd J. Holt, China Lake; Clayton E. Panlaqui, Ridgecrest, both of Calif.

[73] Assignee: The United States of America as represented by the Secretary of the Navy, Washington, D.C.

[21] Appl. No.: 943,886

[22] Filed: Sep. 19, 1978

[51] Int. Cl.$^2$ .......................... B64D 1/04; F41F 5/02
[52] U.S. Cl. .................................. 89/1.5 R; 89/1.5 E; 244/137 R
[58] Field of Search ................ 89/1.5 F, 1.5 G, 1.5 E, 89/1.5 R; 244/137 R; 294/83 NE, 83 R; 60/632

[56] References Cited

U.S. PATENT DOCUMENTS

| | | | |
|---|---|---|---|
| 2,822,207 | 2/1958 | Steinmetz et al. | 89/1.5 F X |
| 3,059,956 | 10/1962 | Geffner | 294/83 R |
| 3,368,064 | 2/1968 | Holt et al. | 89/1.5 E X |
| 3,610,094 | 10/1971 | Craigie | 89/1.5 F |
| 3,916,760 | 11/1975 | Sewell et al. | 89/1.5 F X |
| 3,974,990 | 8/1976 | Holt et al. | 89/1.5 F X |
| 4,095,762 | 6/1978 | Holt | 89/1.5 F X |

Primary Examiner—David H. Brown
Attorney, Agent, or Firm—R. S. Sciascia; W. Thom Skeer; Roy Miller

[57] ABSTRACT

A variable force control system for weapon ejection mechanisms wherein variable ejection forces are applied after measurement of inflight aerodynamic forces on the weapon and thereupon selecting power from one or more fluid power sources of equal or unequal volume and equal or unequal pressure to effect movement of a fixed stroke power piston.

11 Claims, 4 Drawing Figures

VARIABLE FORCE CONTROL SYSTEM FOR WEAPON EJECTION MECHANISMS

BACKGROUND OF THE INVENTION

1. Field of the Invention

The need for a workable suspension and release system which will positively eject a store carried by an aircraft has become increasingly critical. Aerodynamic loads may cause the store to maneuver violently before dropping away from the aircraft, in some cases even striking the aircraft structure. It has also been difficult to successfully drop a store during many types of maneuvers because, by reason of the maneuvers, the stores would not move sufficiently far away from the aircraft to avoid striking portions of the aircraft structure or adjacent stores. In addition to the effects from aerodynamic loads, negative and positive "g" conditions caused by aircraft maneuvers also pertubate the manner in which the store is released from the aircraft.

2. Description of the Prior Art

Current ejection variability is achieved by selecting, from a minimal number of cartridges, a cartridge or cartridges to approximate the required ejection force of an aircraft weapon/store. This force is usually determined by the mass of the store and does not always take into consideration the effects of aircraft flow field. The cartridge selected has a fixed force value and cannot be replaced or adjusted once in flight.

In some cases, the cartridge gases can be metered to compensate for a known weapon weight and active forces and moments for a specific delivery condition. However, in the real world of air combat, the probability of obtaining this one known weapon ejection condition at the time of release is highly unlikely and could cause catastrophic failure to the weapon/aircraft and/or the mission.

SUMMARY OF THE INVENTION

The present invention comprises a system for providing inflight, selectable or automated, variable ejection power to counteract the finite but infinitely variable aircraft flow field induced forces and moments acting upon stores during flight and aircraft separation. The gas power storage influencing the power piston in the store's ejection mechanism is divided into individual chambers of equal or unequal volume and equal or unequal pressures. The individual chambers are manifolded and the communication between the individual chambers and the manifold is controlled by a valve in each of the chambers. The weapons computer aboard the aircraft receives inputs from sensors which sense the forces acting on the store during flight. Under command of the computer, the valves are actuated to provide the desired pressure. The individual chambers can be actuated individually or in any combinations thereof to produce variable power pressures which will act on the power piston in the store's ejection mechanism.

DESCRIPTION OF THE PREFERRED EMBODIMENT

Figure 1:
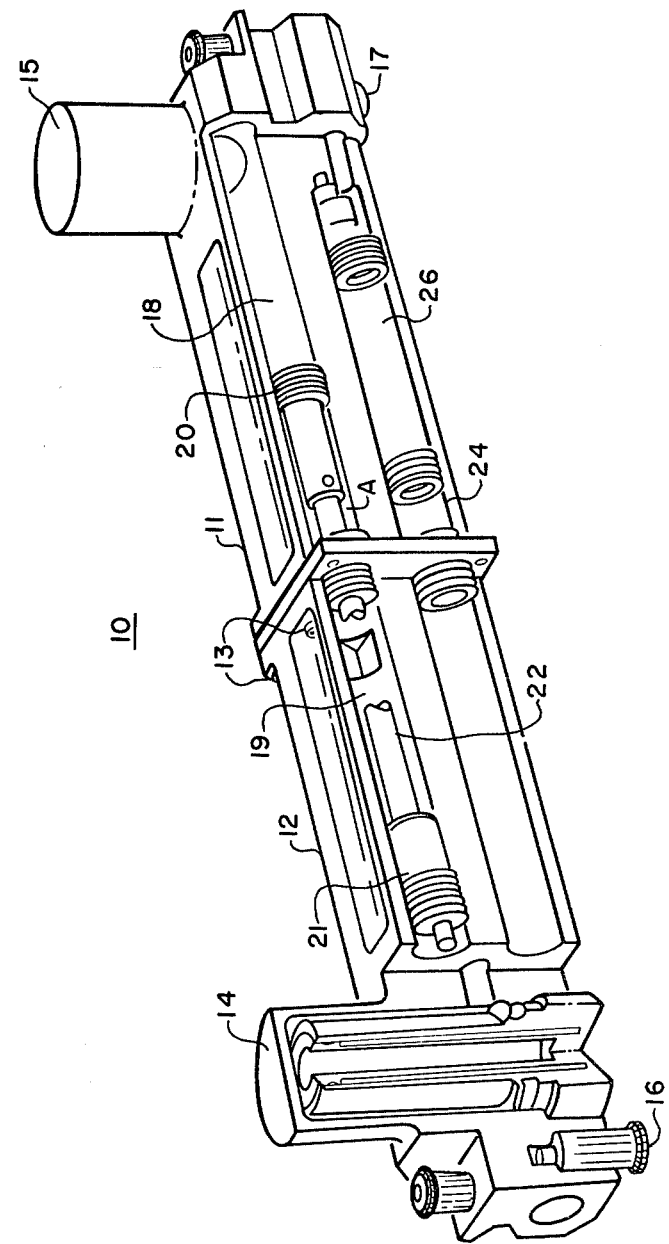
FIG. 1 is a side elevation, partly cut away, of an advanced missile launcher.

FIG. 1 is a side elevation, partly cut away, showing an advanced missile launcher, a stores structure designed for aircraft attachment. The launcher comprises a structure generally indicated at 10 incorporating a right section 11 and left section 12 with respect to FIG. 1. The right and left sections are bolted together by means of bolts generally indicated at 13 so that a center section may be inserted if a longer structure is required for a particular weapon or aircraft installation.

Ejectors are indicated generally at 14 and 15 and missile attachments are generally indicated at 16 and 17. Part of the missile attachment may be the sensor set forth in co-pending application Ser. No. 943,885, filed Sept. 19, 1978 by Lloyd J. Holt.

Stores structure 10 is formed internally such that there are various cylindrical chambers wherein various and sundry electronics, hydraulic oil and gaseous nitrogen ($GN_2$) are contained. For instance, in FIG. 1, hydraulic oil is contained in a chamber 18 which is used to drive an ejector piston in ejector 15. Hydraulic chamber 19 contains oil for driving an ejector piston in ejector 14. The hydraulic oil 18 and 19 is acted on by power pistons 20 and 21 respectively which are linked together by a rod 22 so that they are mutually dependent in their movement.

$GN_2$ working fluid is contained within a chamber A which acts on piston 20 so that when piston 20 is released it is caused to move to the right in FIG. 1. $GN_2$ is also contained in a primary chamber 24 and secondary chamber 26 which are used for auxiliary equipment and to reset various mechanisms contained within the structure. These form no part of the present invention and are therefore not discussed in detail.

Figure 2:
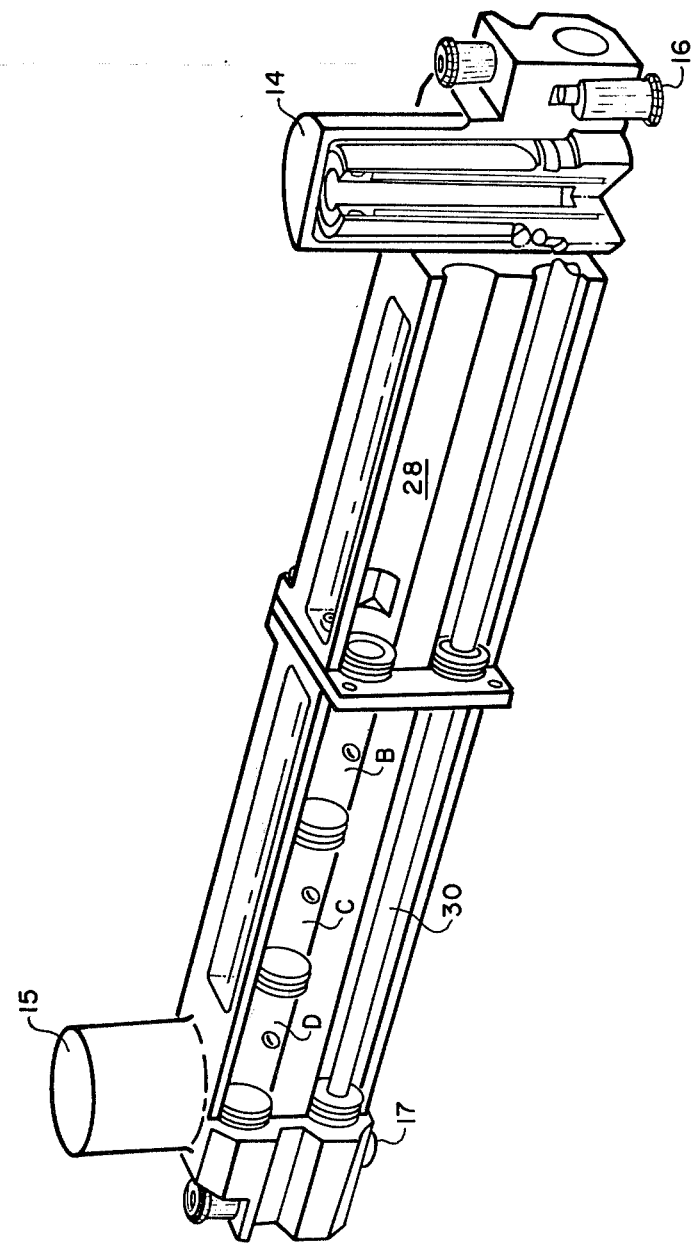
FIG. 2 is a side elevation of the opposite side from FIG. 1 of an advanced missile launcher.

The other side of the structure is shown in FIG. 2 wherein chambers B, C and D are formed directly opposite chamber A. Hydraulic oil from chamber 19 is conducted through chamber 28 to the ejector 14. Linkage indicated schematically at 30 is contained within the other two chambers of the structure. The linkage controls a gas solenoid and poppit valve for the power stroke, weapons release, sway braces, etc. and any other mechanisms on the structure that require actuation. Again, this portion of the assembly forms no part of the present invention and is therefore not shown nor discussed in detail.

Figure 3:
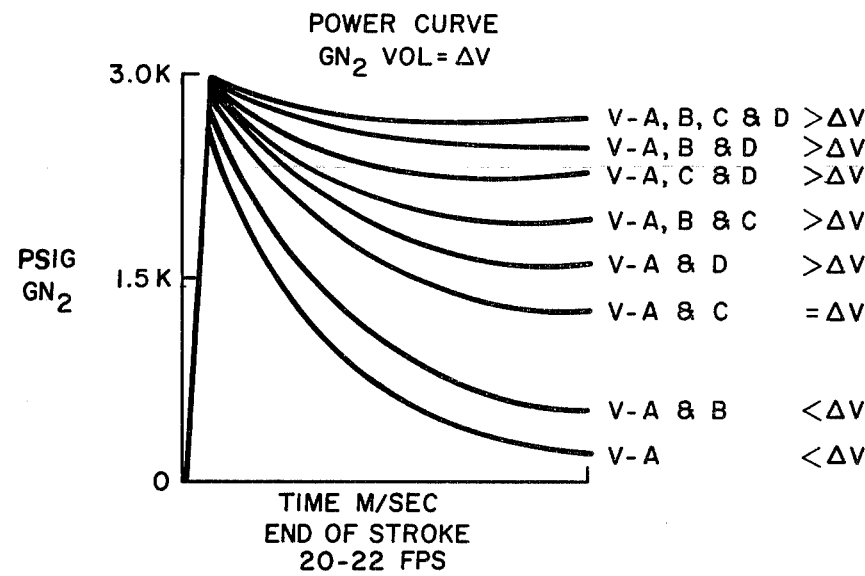
FIG. 3 is the power curve of the system.

FIG. 3 is a graph of the power curve showing time versus pressure for the various combinations of gaseous nitrogen contained in the chambers A, B, C, and D.

Figure 4:
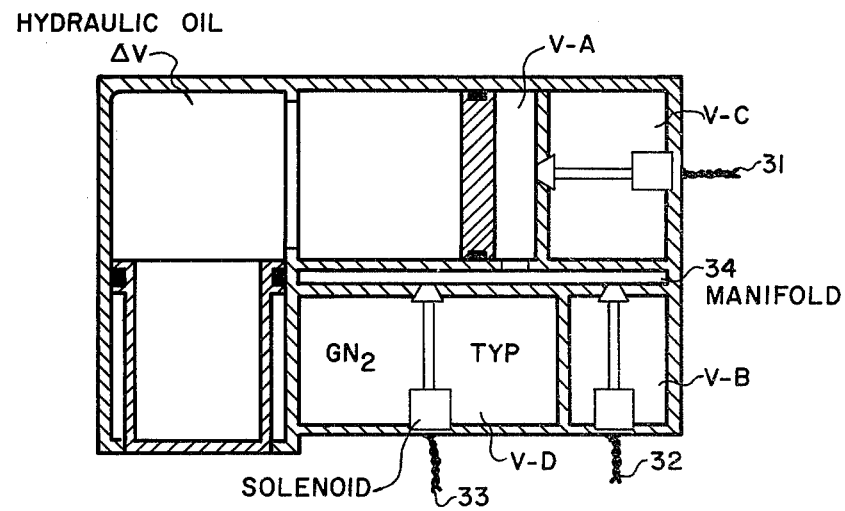
FIG. 4 is a diagramatic showing of the various chambers.

FIG. 4 is a diagrammatic showing of the chambers and the manner in which they can be actuated by solenoid valves generally indicated at 31, 32 and 33. A manifold generally indicated at 34 communicates with each of the individual chambers to convey the gaseous nitrogen from the individual chambers B, C and D to the chamber A. The system is shown in its quiescent or cocked position in FIG. 4.

Individual chambers A, B, C, and D are constructed such that they are of unequal volume and may be pressurized to unequal pressures. Power pistons 20 and 21 always have the same stroke and a specified area. The gas pressure from the chambers A, B, C, and D acting upon the power piston's 20 area determines the high initial force output of the system. The volume of gas acting upon the power system during the power piston's travel determines the power curve. Each volume, i.e., A, B, C, or D, individually produces a different force and power curve for that particular volume. In the same way, combinations of the different volumes can be combined to provide again, different force and power curves.

The solenoid valves 31, 32 and 33 are actuated under control of the weapons release computer, not shown, which is part of the aircraft armament system. The weapons computer receives inputs from the sensors contained in the missile attachments 16 and 17 so that at any one instant, the aerodynamic loading on the store is known and the correct separation force can be calculated by the weapons computer. Once calculated, the weapons computer determines which chambers should be actuated to most nearly provide the correct ejection force.

Inflight selection of force and power curves where stores of different weight having varying forces and moments acting thereon is therefore possible. The ejection force versus store weight, plus or minus g forces and aerodynamic loading acting upon the stores in flight can be selected in flight for safe ejection of stores throughout the flight envelope of the aircraft. Tailoring of ejection forces to the store's inflight environment increases safety and ballistic accuracy.

The present invention will eliminate cartridge actuated ejector systems which are fixed force and moment systems which require high maintenance and cannot be varied during flight.

What is claimed is:

1. A variable-power, dual ejector for an aircraft weapon stores structure in a system having sensors for measuring inflight aerodynamic induced forces on the stores comprising:
   a stores structure carried by the aircraft for carrying stores thereon;
   fluid actuated ejector means on said stores structure for ejecting stores from said structure;
   a source of working fluid in effective fluid communication with said ejector means;
   said source including a plurality of fluid chambers, each chamber having predetermined volume and pressure;
   and valve means between said fluid actuated ejector means and said source of working fluid selectively controlling the release of said working fluid in said source.

2. A variable powered dual ejector as set forth in claim 1 wherein:
   said source of working fluid is contained within the stores structure.

3. A variable-power, dual ejector as set forth in claim 1 wherein the effective fluid communication between said fluid actuated ejector means and said source of working fluid is via a piston and volume of hydraulic oil.

4. A variable-power, dual ejector as set forth in claim 3 wherein said working fluid is gaseous nitrogen.

5. A variable-power, dural ejector as set forth in claim 3 wherein:
   said stores structure is configured to enclose said plurality of fluid chambers internally thereof;
   and wherein each of said individual chambers is isolated one from another.

6. A variable-power, dual ejector as set forth in claim 5 and further including:
   a manifold contained within said stores structure said manifold being configured for selective fluid communication with each of said fluid chambers.

7. A variable power dual ejector as set forth in claim 6 wherein the aforesaid valve means further includes:
   a plurality of individual valves, each valve in fluid communication between said manifold and one of said fluid chambers;
   each of said plurality of valves being controllable under command of an associated solenoid.

8. A variable power dual ejector as set forth in claim 7 wherein said working fluid is gaseous nitrogen.

9. A variable-power, dual ejector for an aircraft weapon stores rack comprising:
   a stores structure for carrying stores thereon;
   fluid actuated ejector means on said stores structure for ejecting said carried stores from said structure;
   a source of working fluid in effective communication with said ejector means;
   said source of working fluid including a plurality of mutually isolated chambers containing said working fluid, each chamber having a predetermined volume and pressure;
   and electrically operated valve means effectively positioned between said fluid actuated ejector means and said source of working fluid for controlling the release of said fluid in said source upon application of electrical energy thereto.

10. A variable power dual ejector as set forth in claim 9 wherein;
    said source of fluid is carried internally of said stores structure.

11. A variable-power, dual ejector as set forth in claim 9 and further including:
    manifold means formed internally of said stores structure;
    said manifold means being in fluid communication via said electrically operated valve means with said individual chambers comprising said source of fluid;
    wherein said electrically operated valve means is configured for selective operation to release working fluid from selected ones of said individual chambers.

* * * * *